(12) United States Patent
DeLuca et al.

(10) Patent No.: US 8,938,708 B2
(45) Date of Patent: Jan. 20, 2015

(54) DETERMINING PROJECT STATUS IN A DEVELOPMENT ENVIRONMENT

(75) Inventors: Lisa Seacat DeLuca, San Francisco, CA (US); Xue Jiang, Carlisle, MA (US); Asima Silva, Holden, MA (US)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 13/584,846

(22) Filed: Aug. 14, 2012

(65) Prior Publication Data
US 2014/0053125 A1 Feb. 20, 2014

(51) Int. Cl.
*G06F 9/44* (2006.01)

(52) U.S. Cl.
USPC .......................................................... 717/101

(58) Field of Classification Search
USPC .......................................................... 717/101
See application file for complete search history.

(56) References Cited

U.S. PATENT DOCUMENTS

| | | | | |
|---|---|---|---|---|
| 6,026,362 | A * | 2/2000 | Kim et al. ...................... | 705/317 |
| 8,595,685 | B2 * | 11/2013 | Sharma et al. ................. | 717/101 |
| 8,781,924 | B2 * | 7/2014 | Bang et al. ...................... | 705/30 |
| 2006/0041856 | A1 * | 2/2006 | Holloway et al. .............. | 717/101 |
| 2006/0167737 | A1 | 7/2006 | Muller et al. | |
| 2009/0037869 | A1 | 2/2009 | Hamilton et al. | |
| 2009/0070734 | A1 * | 3/2009 | Dixon et al. ................... | 717/102 |
| 2009/0119638 | A1 * | 5/2009 | Li et al. .......................... | 717/101 |
| 2009/0293043 | A1 * | 11/2009 | Begel et al. .................... | 717/122 |
| 2010/0287023 | A1 | 11/2010 | Knobel et al. | |
| 2011/0191746 | A1 | 8/2011 | Packbier et al. | |
| 2011/0252394 | A1 * | 10/2011 | Sharma et al. ................. | 717/101 |
| 2012/0042237 | A1 | 2/2012 | Armandpour et al. | |
| 2012/0054250 | A1 | 3/2012 | Williams et al. | |
| 2012/0079447 | A1 * | 3/2012 | Arnott et al. ................... | 717/101 |
| 2013/0046585 | A1 * | 2/2013 | Bang et al. ..................... | 705/7.38 |
| 2013/0111428 | A1 * | 5/2013 | Begel et al. .................... | 717/101 |
| 2014/0053125 | A1 * | 2/2014 | DeLuca et al. ................. | 717/101 |

OTHER PUBLICATIONS

Dart, S. et al. "Software Development Environments" pp. 18-19. Computer. vol. 20, Issue 11. Nov. 1987. IEEE Computer Society.
"Git User Guide-NetBeans IDE Tutorial" pp. 6-7. [online] [retrieved on: Aug. 10, 2012] Retrieved from the internet: http://netbeans.org/kb/docs/ide/git.html?print=yes.

* cited by examiner

*Primary Examiner* — Don Wong
*Assistant Examiner* — Marina Lee
(74) *Attorney, Agent, or Firm* — Stephen Darrow; Trentice Bolar; Matthew Chung

(57) ABSTRACT

A method and program product to monitor the activities of a named person for developing a computer program. The method comprises the steps of logging operations performed by a software build tool or software test tool, a record in the log for each of the operations comprising an identity of a person that requested the operation and a time stamp of the operation; identifying the activities of the named person; determining that the named person is currently accessing the software build tool or software test tool; querying the log records with a time stamp within a predetermined period to determine that the named person has used the software build tool or software test tool to develop the computer program within the predetermined period; and reporting to the user that the named person used the tool to develop the computer program within the predetermined period.

15 Claims, 5 Drawing Sheets

DETERMINING PROJECT STATUS IN A DEVELOPMENT ENVIRONMENT

FIELD OF THE INVENTION

The present invention relates generally to providing project status updates in a computer programming development environment, and more particularly to providing project status updates that include the status of tasks in real-time.

BACKGROUND

An important aspect of project management, such as the management of projects in a computer software development environment, is the ability to track the progress of project tasks. Progress is typically reported in a project status report that is based on status updates provided by individuals, such as computer software developers, who have been assigned tasks, such as the writing, debugging, and testing of computer software code, completion of requirements documents, etc., that are required to complete the computer software development project. The project status report is usually run on a periodic basis, such as each week, and may be provided to those with direct or indirect responsibilities for the completion of project tasks. Such reports may also be useful for individuals who require the completed deliverables of other members of the project team before they can complete their assigned tasks.

Task status is typically provided by developers by logging into a project management program and manually updating information specific to tasks assigned to them. The task status update information can include, for example, whether a task has been completed, percentage completed, hours worked on the task, changes in task completion dates, comments related to the task, etc.

There often is a desire by project team management and project team members to have current task status information from members of the team. Such requests require the individual to interrupt their current work, collect information on the tasks that are currently in progress and those that have completed since the last project status update report, or the last task status update request from the same requestor, and report back to the requestor. Known development programs, for example, Rational Team Concert (JAZZ), Cygwin, Telnet, WebSphere Admin Console, track what development tools and computer code an employee is currently accessing and log this information. (Note: the terms "Rational Team Concert," "JAZZ," "Cygwin," and/or "WebSphere" may be subject to trademark rights in various jurisdictions throughout the world and are used here only in reference to the products or services properly denominated by the marks to the extent that such trademark rights may exist.)

An object of the present invention is to monitor status of a project and activities of employees working on the project without interrupting the employees.

SUMMARY

Embodiments of the present invention provide a method and program product to monitor the activities of a named person for developing a computer program, the method comprising the steps of: logging one or more operations performed by (a) a software build tool to build the computer program or (b) a software test tool to test the computer program, a record in the log for each of the operations comprising an identity of a person that requested the operation and a time stamp of the operation; and responsive to the user request to identify the activities of the named person, determining that the named person is currently accessing the software build tool or software test tool, and in response, querying the log records with a time stamp within a predetermined period to determine that the named person has used the software build tool or software test tool to develop the computer program within the predetermined period, and reporting to the user that the named person has used the software build tool or software test tool to develop the computer program within the predetermined period.

DETAILED DESCRIPTION

Embodiments of the present invention will now be described in detail with reference to the accompanying drawings.

Figure 1:
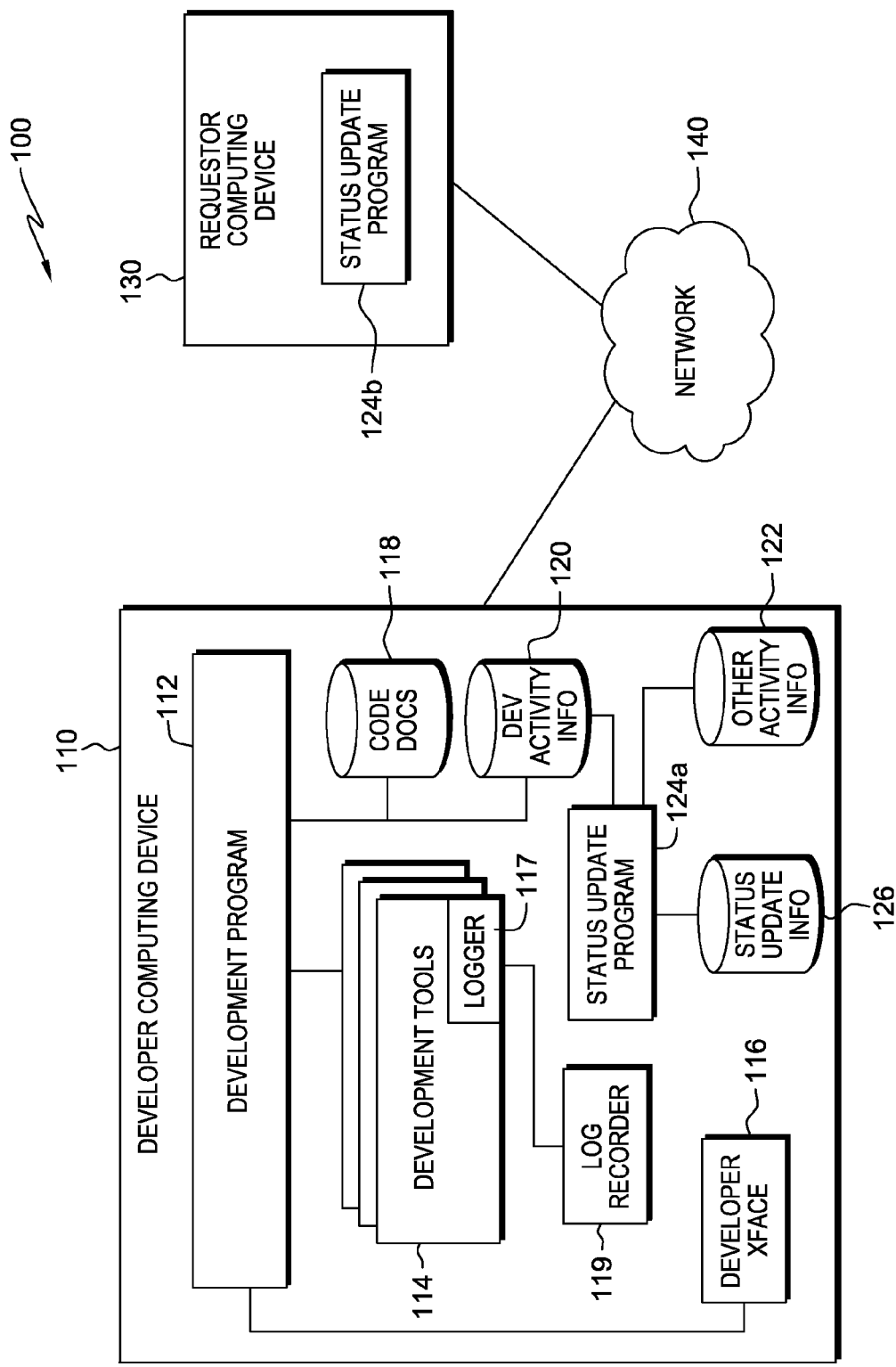
FIG. 1 is a functional block diagram of a user status processing system, in accordance with an embodiment of the present invention.

To begin, FIG. 1 represents a functional block diagram illustrating developer status processing system 100. Developer status processing system 100 includes developer computing device 110 and requestor computing device 130, connected over network 140. Network 140 can be, for example, a local area network (LAN), a wide area network (WAN) such as the Internet, or a combination of the two, and includes wired, wireless, or fiber optic connections. In general, network 140 can be any combination of connections and protocols that will support communications between developer computing device 110 and requestor computing device 130 in accordance with a desired embodiment of the invention. In embodiments of the invention, developer computing device 110 and requestor computing device 130 can each be, for example, a mainframe or mini computer, a laptop, tablet, or netbook personal computer (PC), or a desktop computer. In general, developer computing device 110 and requestor computing device 130 can be any programmable electronic device capable of supporting the required functionality of an embodiment of the invention, and as described in further detail with respect to FIG. 3. In a preferred embodiment, developer computing device 110 is used to develop software and includes a developer user interface 116, software development tools 114 and software coding documents 118. Developer Computing device 110 also includes a status update program 124a, other activity information 122, and code development activity information 120. In preferred embodiments, developer computing device 110 with its software development programs allows a development team member, such as a developer or project manager, to execute any and all phases of the software development cycle, for example, from specification through writing, editing, building, compiling, and test/debugging of machine executable code, to software maintenance.

In general, development program 112 can be any software capable of supporting any and all phases of a software development cycle and may include, for example, the specification phase, coding phase, building phase, herein defined as the process of using a build tool to convert a plurality of source code files into a standalone software capable of running on a computer by transforming source code into machine executable code (compiling) and combining in the correct order objects generated by compiling the plurality of source code files into a single machine executable program (linking), compiling phase, described above, a maintenance phase, or any combination thereof. A software development cycle may also include a test/debugging phase, herein defined as the process of using a test/debugger tool to at least validate and verify that a computer program, application, or product: meets the requirements that guided its design and development; works as it was designed to work; can be implemented with the same characteristics as it was designed to have; satisfies the needs of a developer or their corporation, does not contain any bugs, errors, or other defects; or any combination thereof. Development program 112 generates real-time and static development activity information that reflects a developer's progress, historic or current development activities, for example, on a particular development activity and project, logger 117 logs this information and log recorder 119 records the logs. Typically, development projects may either be imported into or created within a software development environment. A developer accesses development program 112 via developer interface 116.

Developer interface 116 may be a graphical user interface, according to a preferred embodiment of the present invention. In preferred embodiments, development program 112 logs developer coding activities in an activity information file (not shown) stored in development activity information 120. In an additional embodiment, a developer might execute a code editing tool, code building tool, or test/debugging tool, for example development tools 114, which operates on computer code, for example coding documents 118. For example, in response to a developer accessing and using the build tool to build code, logger 117 logs the date/time that the build tool was accessed, how long the build tool was accessed for, the name of the computer code accessed by the user, how long the computer code was accessed for, and userID of the person that accessed the build tool, userID of the person that accessed the computer codes and log recorder 119 records the log file into development activity information 120. In another example, after a developer accesses and uses the test/debugger tool to find and reduce defects and flaws a program, development program 112 logs into development activity information 120 the date/time of the test, the name of the program which was tested, and the identity such as the userID of the person who commanded the test/debugger tool to test the program. In general, the activity information file created by development program 112 may include, for example, project information, date and time of the activity, name of the development tool accessed, name of the computer code that was accessed, user identification, and whether the computer code has been modified, added, removed, or merged, and total time that the developer allocated towards an activity.

In other embodiments development program 112 is installed or stored on a local, remote or cloud-based server, and developers, managers and others access them by any computing device via network 140.

In preferred embodiments of the invention, developer interface 116 allows a developer not only to access, but also to manipulate development tools 114 and coding documents 118 through development program 112. Developer interface 116 typically is a graphical user interface (GUI) that is displayed on a display screen, such as monitor 920 (see FIG. 3), and includes navigation menus and other graphical elements that a developer may use, via, for example keyboard 930 and computer mouse 934, to access development tools 114, coding documents 118, and to perform other development related tasks, as described above, in accordance with a preferred embodiment of the invention. In another embodiment, developer interface 116 may be a textual user interface.

In preferred embodiments of the invention, development tools 114 represent programs that access and manipulate coding documents 118 through development program 112 via developer interface 116. Development tools 114 may include, for example, high level architecture design tools, a builder tool, a text or code editor tool that creates coding documents, for example coding documents 118, a compiler tool, an interpreter tool, a test/debugger tool, optimization tools, and a target simulator tool that allows the testing of software in a simulated environment that mimics the target environment that the software ideally operates in. In other embodiments, development tools 114 can also include project management tools for project planning and task tracking.

Coding documents 118 represent development related documents produced by a developer in the course of completing tasks associated with a development project, in accordance with a preferred embodiment of the invention. For example, coding documents 118 can be documents for designing, writing, testing, debugging, and maintaining the source code of computer programs. Coding documents 118 typically are accessed through development program 112 via developer interface 116, or by development tools 114 through development program 112, in accordance with a preferred embodiment of the present invention.

In preferred embodiments of the present invention, development activity information 120 represents documents reflective of developer current development activity information, defined here as a developer's tasks, procedures, computer code, development tools, and processes that are currently running within or accessed by developer computing device 110 by the developer and have not yet reached completion. Development tools 114 generate development activity information 120 that may be searched using hash functions, herein defined as algorithms or subroutines that map large data sets of variable length (keys), for example, metadata files, to smaller data sets of a fixed length (hashes), and a hash tables, for example, data structures that use a hash function to map keys to their associated value. In general, metadata files may include descriptive information reflective of, for example, the software development project associated with a metadata file, development activity description, for example, a description of computer code modifications, userID, the development tool accessed by the user, the computer code accessed by the user, login and log off date and time, time and date of file creation, creator or author associated with the activity, how long the user accessed the development tool, how long the user accessed the computer code, and file name. Status update program 124a accesses the development activity information 120 to produce developer status updates of varying scope, for example, developer status updates on a developer's general progress, as well as developer status updates that focus on a specific file, computer code, development tool, workspace, collaborative software development project, and method, described here as a block of code associated with a particular class or object in order to perform a task, in accordance with a preferred embodiment of the present invention. In general, development activity information 120 includes information that reflects developer progress, for example, on a specific task or project.

In accordance with a preferred embodiment of the present invention, development activity information 120 typically can include static information, for example, information that includes, pending changes in outgoing changesets, where a "pending change" is a change that is awaiting approval and a "changeset" refers to a set of files that reflects all the revisions made to a set of coding documents that belong to the same task or work item, for example coding documents 118, categorized at least by the author of the changes and when the changes occurred. Continuing, static information may also include, for example, unresolved changes, defined here as a change that has not been included in a changeset, command line tasks initiated by a developer, developer browser history, changesets delivered by a developer, and changesets accepted. In addition, development activity information 120 may include real-time information, for example, information reflecting tasks and processes, and the projects they are associated with, that are currently running on developer computing device 110, in accordance with preferred embodiments of the invention.

In preferred embodiments of the invention, status update program 124*a*, the operation of which is explained in greater detail below with respect to FIG. 2, operates generally to determine a developer's progress on project tasks in relation to a request for a status update received from another computing device, for example, requestor computing device 130, and returns the status update to the requestor's computing device, for example, requestor computing device 130. In another embodiment, status update program 124*a* operates generally to determine which development tool and computer code was accessed by an employee, what activities were performed on the code by the employee, and the date and time that the access and activities occurred on. Status update program 124*a* resides on developer computing device 110 and includes status update information 126, in accordance with preferred embodiments of the invention. Status update program 124*a* can store authorized status update requests (requests) received from status update program 124*b*, via network 140, determine the authorized portion of the real-time and static project activity information that is associated with the request, and transmit the determined authorized portion of the real-time and static project activity information to status update program 124*b* in electronic form where the determined authorized portion of the real-time and static project activity information includes, for example, textual information, graphical information, audio information, or any combination thereof, in accordance with a preferred embodiment of the present invention. Using the details of both a request and predetermined privacy setting information stored in status update information 126, status update program 124*a* typically determines an authorized portion of the real-time and static developer activity information from development activity information 120, determines an authorized portion of the real-time and static developer activity information from other activity information 122, and transmits the determined authorized portion of the real-time and static developer activity information.

In preferred embodiments, status update information 126 includes results of stored developer authorized requests transmitted by status update program 124*b* to status update program 124*a* and pre-determined privacy setting information. The pre-determined privacy setting information is associated with status update information 126 and includes information reflective of a user's ability to receive status updates, for example, in general, on a particular file, task, or project, in accordance with a preferred embodiment of the invention. The pre-determined privacy setting information may contain privacy setting information determined by one or more of: a user of a first computing device, for example developer computing device 110, a user of a second computing device, for example a user of requestor computing device 130, or by a relationship, for example, a business relationship, of a requestor, for example, the user of requestor computing device 130, relative to a user of the first computing device, in accordance with a preferred embodiment of the invention. The pre-determined privacy setting information may reside on the developer's computing device, for example, developer computing device 110, the requestor's computing device, for example, requestor computing device 130, or a network server.

Status update program 124*a* accesses status update information 126 to initiate the processing of a request received from status update program 124*b*. Preferred embodiments of the invention may also include requests that contain the following components: developer name; requestor identification; project name; activity description, for example, the changing, adding, or removal of a specific file, computer code, workspace, project, development program, or method, defined here as a block of code that performs a particular function; request receipt date; request delivery date; and request delivery information that allows the transmission to initiate at a predetermined number of minutes, days, weeks, or months; or number of minutes after a file, workspace, project, changeset, or method has been modified. In other embodiments of the invention, status update program 124*a* may service a request, for example, a repeating request, that originates from a scheduling deamon of a computing device, for example, a network server (not shown) or requestor computing device 130.

In preferred embodiments of the invention, other activity information 122 represents information associated with development activities occurring on developer computing device 110 that are reflective of both real-time and historic developer activity that occurs outside of development program 112. Other activity information 122 typically may include hash functions, hash tables, and metadata files that reflect, for example, the development project associated with a file, computer code, activity description, file or code creation time and date, activity creator or author, program access duration, and location where the file or code was created. For example, other activity information 122 may include information derived from any development related programs that are not associated with development program 112, for example, information reflecting command line tasks currently running provided by, for example, the remote access functionality of a secure shell client, internet browser activity information, and email activity information provided by, for example, an email archiving program. Other activity information 122 is accessed by status update program 124*a* in order to process an authorized request received from status update program 124*b*, in accordance with preferred embodiments of the invention. In general, other activity information 122 represents information reflecting development related activities that occurs outside of a software development environment, for example, development program 112, and is typically a collection of information from various data sources.

In preferred embodiments of the invention, requestor computing device 130 represents a computing device that transmits a developer status update request to a developer computing device, for example, developer computing device 110, and receives the determined authorized portion of the real-time and static project activity information relevant to the request from the developer computing device. Requestor computing device 130 includes status update program 124b, and communicates with developer computing device 110 via network 140, in accordance with a preferred embodiment of the invention. In general, requestor computing device 130 can be any programmable electronic device that has the ability to run status update program 124b. In preferred embodiments of the invention, status update program 124b is a computer program that is associated with requestor computing device 130 and transmits a request to status update program 124a via network 140 and receives the results of a processed request from status update program 124a. In a preferred embodiment, status update program 124b generates a request as described above. In general, status update program 124b typically may transmit a request to status update program 124a at particular time intervals, for example: at a predetermined number of minutes, days, weeks, or months; after a predetermined number of minutes after a file, workspace, project, or method has been updated; immediately after a change is added to a particular changeset; or at a predetermined time, for example, at 3:15 PM Eastern Standard Time.

Figure 2:
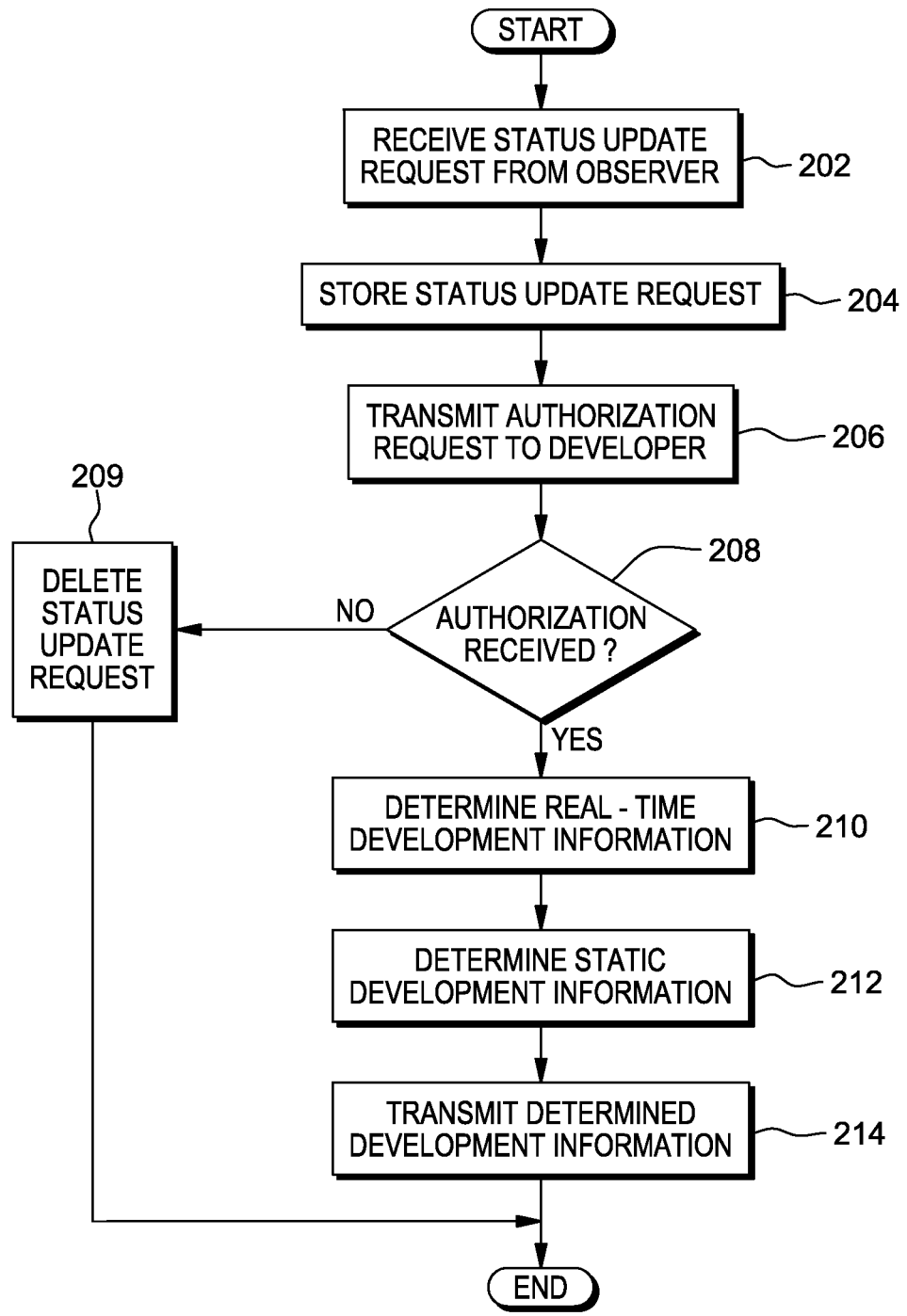
FIG. 2 is a flowchart depicting the steps of a status update program of the system of FIG. 1, in accordance with an embodiment of the present invention.

FIG. 2 is a flowchart illustrating the steps of status update program 124a in accordance with a preferred embodiment of the present invention. As stated above, status update program 124a resides on developer computing device 110 and receives a request from status update program 124b associated with requestor computing device 130 via network 140 (step 202). For example, on May 24, 2012 an individual (Requestor), such as a developer's project team manager or project team member, desires to receive an immediate update on a developer's (Developer) general progress on project ABC since Requestor's last request of May 10, 2012. Requestor accesses status update program 124b and formulates a request comprised of the following information: Date of Submission=05/24/2012:14:14:14; Requestor Name=Requestor; Delivery Date=05/24/2012; Deliver Time=0; Developer Name=Developer; Project Name=ABC; Review Start Date=Last Request Date; and Review End Date=05/24/2012. In this particular example, after the request has been formulated, status update program 124b transmits the request over network 140 to status update program 124a.

After status update program 124a receives the request from status update program 124b, status update program 124a stores the request in status update information 126 (step 204). Continuing with the above example, after status update program 124a receives the request from status update program 124b, status update program 124a uses the data fields of the request to populate the related data fields of a table, or similar data structure, stored in status update information 126.

After status update program stores the request in status update information 126, status update program 124a transmits an authorization request to Developer (step 206). In the current example, status update program 124a transmits an authorization prompt to Developer via monitor 920 wherein Developer must input their pre-determined privacy setting for the Requestor. In alternative examples, status update program 124a can allow Developer to choose a level of privacy, for example by: electing the programs accessed by Developer through development program 112 and outside development program 112 for which developer is authorized to receive processed status update request for; decide if they desire to be continually prompted each time a particular requestor desires an update; add Requestor to a list of individuals that are always authorized to receive status updates related to Developer. In addition, in alternative embodiments, status update program 124a may allow the predetermined privacy setting information to be determined by a person other than the developer; or by the relationship, for example, a business relationship, of the requestor relative to the developer.

If status update program 124a determines that an authorization to process the request transmitted by status update program 142b has not been received from the developer (decision step 208, "no" branch), status update program 124a accesses status update information 126, deletes the request, and terminates. If status update program 124a determines that any portion of the request transmitted by status update program 142b is authorized to be processed by status update program 124a (decision step 208, "yes" branch), status update program 124a, which knows the development tools typically accessed by the developer, accesses development activity information 120 and other activity information 122 in order to retrieve information generated by the development tools accessed by the developer, and determines the developer real-time development information that relates to the authorized portion of the request received from status update program 124b (step 210). In our current example, status update program 124a, using the predetermined privacy settings determined by Developer and its knowledge of the development programs typically used by a developer in order to develop code, accesses status update information 126, retrieves the request, denotes that the "Review Start Date" field reflects "Last Request Date," locates the previous status request entry for Requestor, and determines that May 10, 2012 was the date of Requestor's last request for Developer's status on project ABC. Status update program 124a uses the details of the predetermined privacy setting, the request (details discussed above), and the hash functions and hash tables associated with development activity information 120, and determines real-time information generated by development program 112 that reflects that Developer accessed a build development tool 45 minutes ago and is currently adding code to program ABC, which is associated with task ABC of project ABC, a debugging tool an hour ago and is currently debugging program ABC, which is associated with task ABC of project ABC, and Developer accessed file ABC associated with task ABC of project ABC five hours and thirty-seven minutes ago and is currently making changes to file ABC. After status update program 124a determines the real-time information of development activity information 120, status update program 124a accesses other activity information 122 and, using the details of the predetermined privacy setting, the request (details discussed above), and the hash functions and hash tables associated with other activity information 122, determines all of the developer real-time development information. Continuing with our current example, status update program 124a accesses other activity information 122 and utilizes the information contained in the predetermined privacy setting information, the request, and other activity information 122 hash functions and hash tables and determines that the real-time development activity information associated with the request reflects that there are two command line tasks that Developer is currently monitoring on developer computing device 110.

After status update program 124a determines the real-time development information associated with development activity information 120 and other activity information 122, status update program 124a accesses development activity information 120 and, using the hash functions and hash tables associated with development activity information 120, the information contained in the predetermined privacy setting information and the details contained in the request received from status update program 124a, determines the authorized portion of the Developer's static development information (step 212). In our current example, status update program 124a accesses development activity information 120, utilizes the information contained in predetermined privacy setting information, the request, and the hash files and hash tables associated with development activity information 120 and determines the following authorized static development information: (a) three pending changes in changeset 100123, generated on May 10, 2011, changeset 100124 generated on May 1, 2012, and changeset 100125 generated on May 1, 2012; (b) one unresolved change associated with changeset 100123; (c) Mozilla browser history from May 10, 2012 to May 24, 2012; (d) delivered changesets include 100126 (May 10, 2012), 100127 (May 11, 2012), 100128 (May 12, 2012), 100129 (May 13, 2012), 100130 (May 13, 2012); changeset 100129 was accepted on May 16, 2012; and Developer's tasks associated with project ABC are thirty percent completed as determined by, for example, the ratio of Developer's completed assigned tasks associated with project ABC to Developer's total required tasks associated with project ABC.

After status update program 124a determines the authorized portion of the static information contained in development activity information 120, status update program 124 accesses other activity information 122, utilizes the information contained in the predetermined privacy setting information and its knowledge of the development programs typically used by developers to develop code, the request, and the hash files and hash tables associated with other activity information 122, and determines the authorized portion of Developer's static development information associated with project ABC. For example, status update program 124a determined that authorized portion of the Developer's static development information includes information generated by an email archiving program reflective of Developer's email activity from May 10, 2012 to May 24, 2012 and information generated by an internet browser, for example, Mozilla Firefox, that reflects Developer's internet browser activity from May 10, 2012 to May 24, 2012.

After status update program 124a determines the authorized portion of the developer static development information associated with development activity information 120 and other activity information 122, status update program 124a transmits the determined authorized portion of the real-time and static development information associated with development activity information 120 and other activity information 122 to status update program 124b via network 140 in an electronic form (step 214). In our current example, status update program 124a transmits the determined development information to status update program 124b in a combined format containing graphical and textual information. In alternative embodiments, status update program 124a may transmit the determined authorized portion of the development information to status update program 124b in an electronic format that includes textual information, graphical information, audio information, or any combination thereof. After status update program 124a transmits the determined authorized portion of the development information, status update program 124a terminates (step 216). In an alternative example, after status update program 124a transmits the determined authorized portion of the development information, status update program 124a waits to receive a subsequent status update request.

Figure 3:
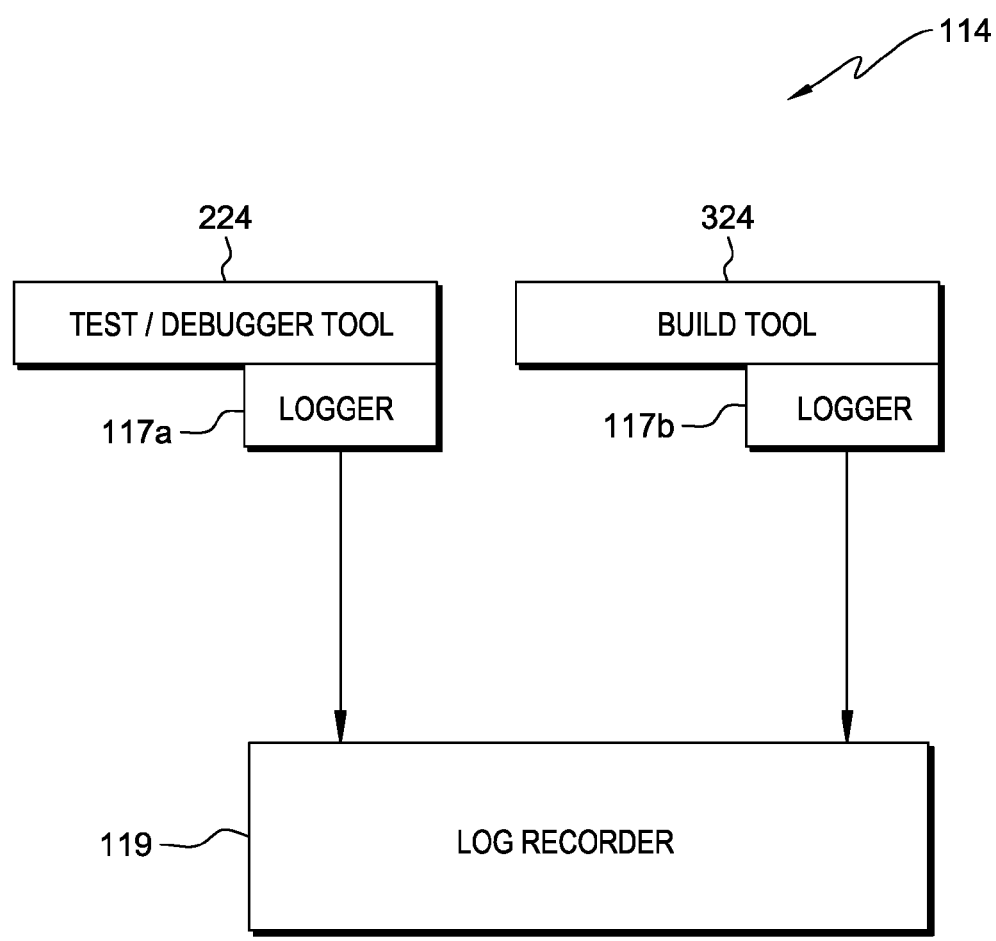
FIG. 3 is an illustration of a block diagram of development tools 114, in accordance with an embodiment of the present invention.
Figure 4:
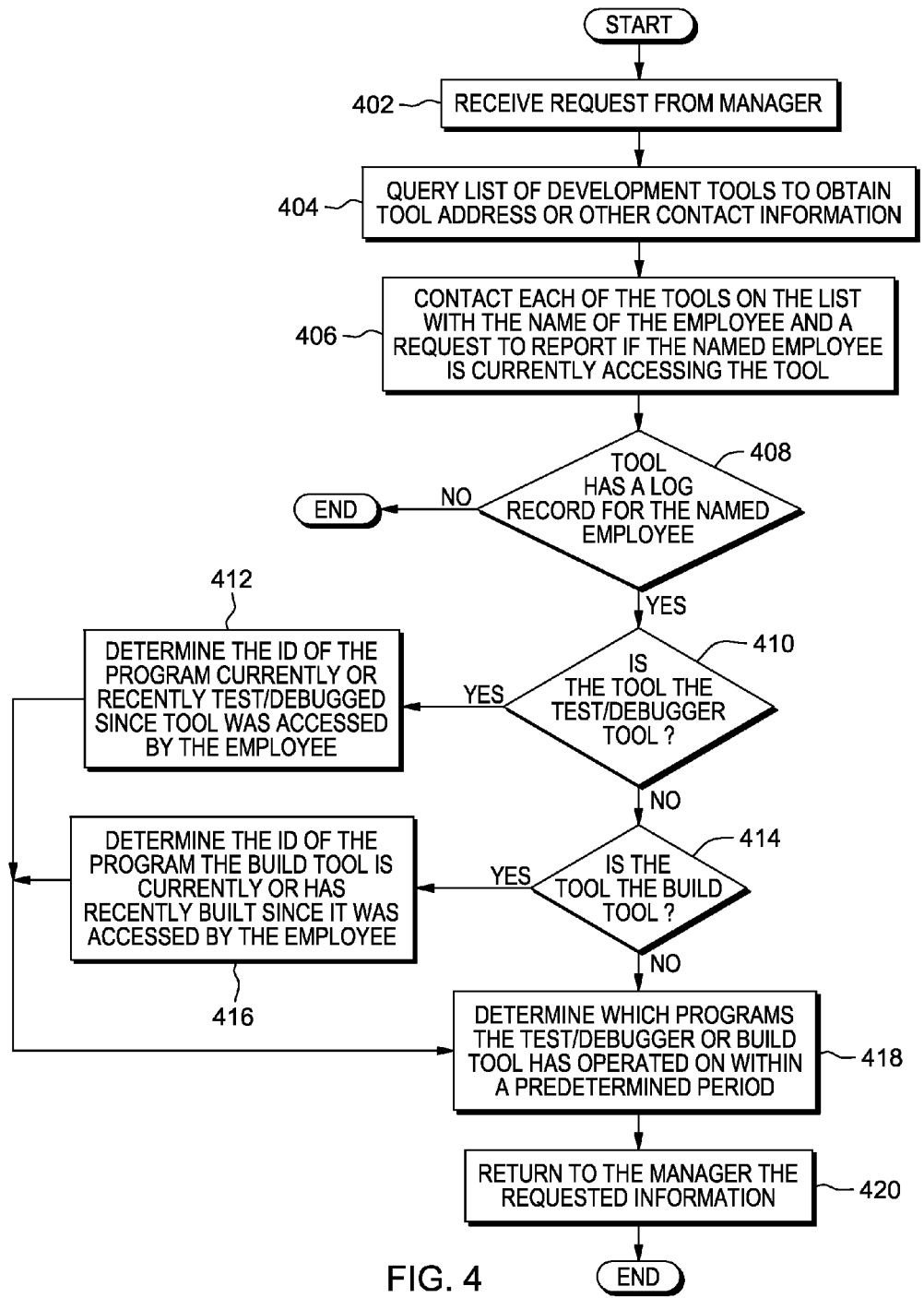
FIG. 4 is a flowchart depicting an example of the steps involved in an alternative embodiment of the present invention that uses elements defined in the discussion of FIG. 3.

FIG. 3 and FIG. 4, described in further detail below, are used here to illustrate an alternative embodiment of the present invention. To begin, FIG. 3 is an illustration of a block diagram of development tools 114, in accordance with an embodiment of the present invention. Development tools 114 contains test/debugger tool 224, which includes logger 117a that at least generates log files, described above, containing information reflecting the date and time that the test/debugger tool was accessed by a developer, the identification of a program that is being analyzed for errors or flaws, whether the test/debugging of the program was successful, the userID of the developer that accessed the test/debugger tool, the userID of the developer that accessed the build tool, the date and time that the test/debugger tool was closed by the developer. Logger 117a generated files are stored by log recorder 119. In addition, development tools 114 contains build tool 324, which includes logger 117b that generates log files, described above, that include information reflecting the date and time that the build tool was accessed by a developer, the identification of the program files that are being combined in the build, whether the combination/build was successful, the userID of the developer that accessed the build tool, the userID of the developer that accessed the program file, the date and time that the build tool was closed by the developer.

FIG. 4 is a flowchart depicting an example of the steps involved in an alternative embodiment of the present invention that uses elements defined in the discussion of FIG. 3 above. In accordance with the present invention, status update program 124a tracks what development tools, for example, a build tool or test/debugger tool, see above for further detail, are currently being used by an employee. An administrator previously compiled a list of software tools, such as the build tool 324 and the test/debugger tool 224, commonly used to develop computer programs within a corporation. The list includes for each of the tools a name or an address of the tool by which or at which the status update program 124a can contact the tool. An alternative embodiment of status update program 124a is described below. To begin, status update program 124a receives a status update request from a manager that desires to know which tools an employee is accessing (step 402). Status update program 124a then queries the list of software tools to obtain tool addresses or other contact information (step 404). Status update program 124a then contacts each of the tools on the list with the name of the employee and a request to report if the named employee is currently accessing the tool (step 406). Each of the tools has a log which recorded who accessed the tool and the log-in and log-off date/time for each such access. Each tool responds with the last date/time of access, including log-in date/time and log-off date/time, of the named employee. Upon finding that such a tool is currently being used by the named employee, the status update program 124a queries the tool for any log records for the named employee which indicate any computer programs that the tool has operated upon for the named employee (step 408). For example, if the tool is a test/debugger tool (yes branch of decisional step 410), then status update program 124a determines the identity of the program the test/debugger tool is currently or has recently tested/debugged since the test/debugger tool was accessed by an employee (step 412). As another example, if the tool is a software build tool (yes branch of decisional step 414), then status update program 124a determines the identity of the program the software build tool is currently or has recently built since the software build tool was accessed by an employee (step 416). Status update program 124a returns the log records, and the status update program then determines which programs the test/debugger tool or build tool has operated upon within a predetermined period, typically from the current time back a predetermined number of minutes or hours (step 418). Next, the status update program returns to the manager the requested information as to which programs the named employee has used the test/debugger tool or build tool to develop within a predetermined period, typically from the current time back a predetermined number of minutes or hours (step 420).

The foregoing description of various embodiments of the present invention has been presented for purposes of illustration and description. It is not intended to be exhaustive nor to limit the invention to the precise form disclosed. Many modifications and variations are possible. Such modifications and variations that may be apparent to a person skilled in the art of the invention are intended to be included within the scope of the invention as defined by the accompanying claims.

Figure 5:
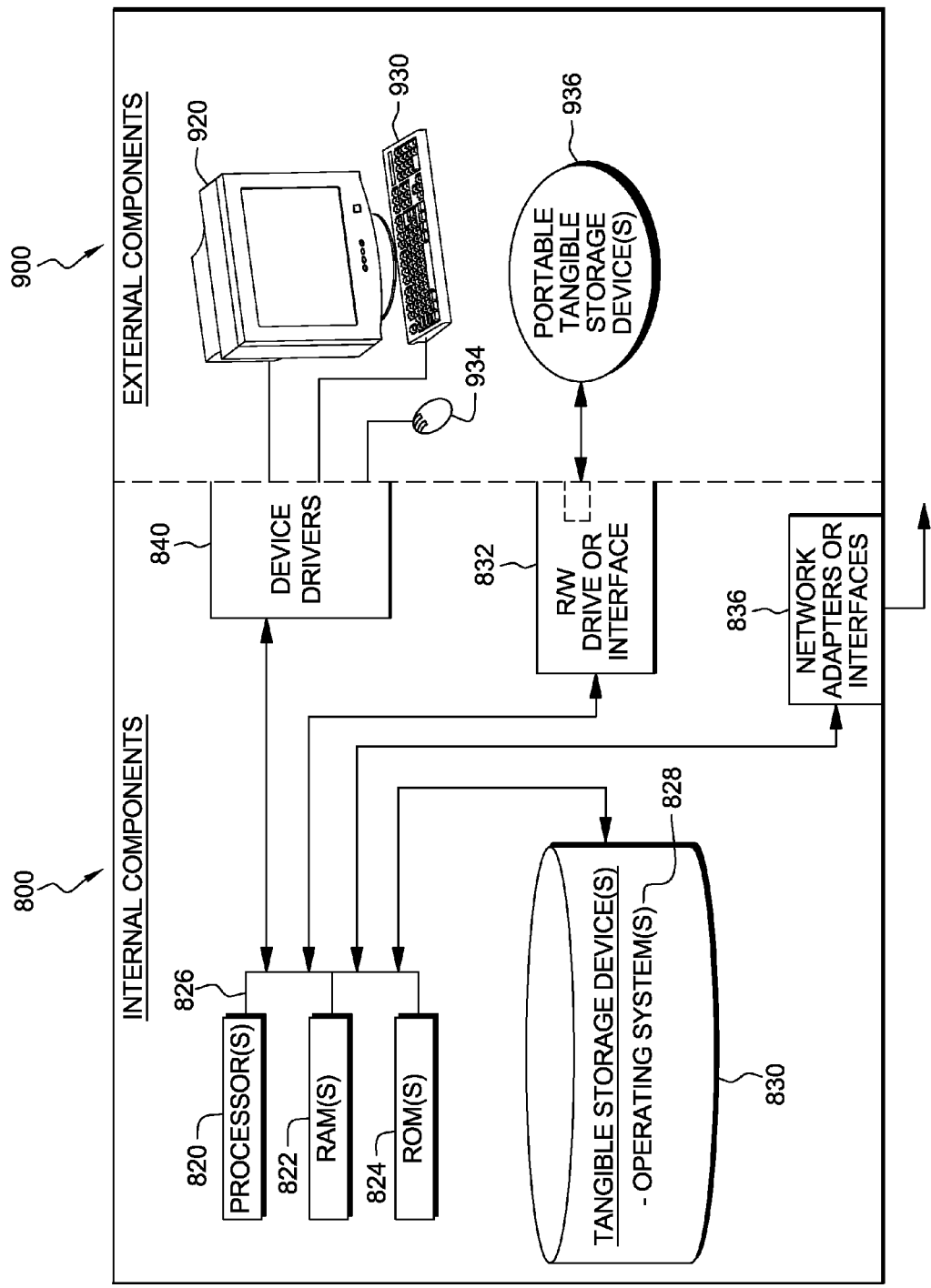
FIG. 5 shows a block diagram of the components of a data processing system 800, 900, such as developer computing device 110, network 140, or requestor computing device 130, in accordance with an illustrative embodiment of the present invention.

FIG. 5 shows a block diagram of the components of a data processing system 800, 900, such as developer computing device 110, network 140, or requestor computing device 130, in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Developer computing device 110, requestor computing device 130, or network 140 includes respective sets of internal components 800 and external components 900 illustrated in FIG. 5. Each of the sets of internal components 800 includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and status update program 124a, in developer computing device 110; and status update program 124b in requestor computing device 130 are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more portable computer-readable tangible storage devices 936 such as a CD-ROM, DVD, memory stick, magnetic tape, magnetic disk, optical disk or semiconductor storage device. The programs 112, 116, 118, 120 and 122 in developer computing device 110; programs 142 and 144 in network 140; and programs 152 and 154 in remote computer 150 can be stored on one or more of the respective portable computer-readable tangible storage devices 936, read via the respective R/W drive or interface 832 and loaded into the respective computer-readable tangible storage devices 830.

Each set of internal components 800 also includes network adapters or interfaces 836 such as a TCP/IP adapter cards, wireless wi-fi interface cards, or 3G or 4G wireless interface cards or other wired or wireless communication links. Status update program 124a in developer computing device 110; and status update program 124b in requestor computing device 130 can be downloaded to respective computing devices 110 and 130 from an external computer via a network (for example, the Internet, a local area network or other, wide area network) and respective network adapters or interfaces 836. From the network adapters or interfaces 836, status update program 124a in developer computing device 110 and status update program 124b in requestor computing device 130 are loaded into the respective computer-readable tangible storage devices 830. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapters or interfaces 836 comprise hardware and software (stored in storage device 830 and/or ROM 824).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Smalltalk, C, and C++. The program code may execute entirely on the developer's computer, partly on the developer's computer, as a stand-alone software package, partly on the developer's computer and partly on a remote computer, or entirely on a remote computer or server. In the latter scenario, the remote computer may be connected to the developer's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

Based on the foregoing, computer system, method and program product have been disclosed in accordance with the present invention. However, numerous modifications and substitutions can be made without deviating from the scope of the present invention. Therefore, the present invention has been disclosed by way of example and not limitation.

What is claimed is:

1. A computer program product for monitoring activities of a named person in developing a computer program, the computer program product comprising:

one or more computer-readable tangible hardware storage devices and program instructions stored on at least one of the one or more storage devices, the program instructions comprising:

program instructions to log real-time development activity information about one or more operations performed by a software build tool to build the computer program, a record in the log for each of the operations comprising an identity of a person that requested the operation and a time stamp of the operation; and program instructions, responsive to a user request to identify the activities of the named person, to determine that the named person is currently accessing the software build tool, and in response, query the log records having a time stamp within a predetermined period to determine that the named person has used the software build tool to develop the computer program within the predetermined period, and report to the user that the named person has used the software build tool to develop the computer program within the predetermined period;

wherein:

the reporting includes information about the named person's tasks, procedures, computer code, development tools, and/or processes that are currently running within or accessed by the software build tool and that have not yet reached completion.

2. A computer program product for monitoring activities of a named person for developing a computer program, the computer program product comprising:

one or more computer-readable tangible hardware storage devices and program instructions stored on at least one of the one or more storage devices, the program instructions comprising:

program instructions to log real-time development activity information about one or more operations performed by a software test tool to test the computer program, a record in the log for each of the operations comprising an identity of a person that requested the operation and a time stamp of the operation; and program instructions, responsive to a user request to identify the activities of the named person, to determine that the named person is currently accessing the software test tool, and in response, query the log records having a time stamp within a predetermined period to determine that the named person has used the software test tool to develop the computer program within the predetermined period, and report to the user that the named person has used the software test tool to develop the computer program within the predetermined period;

wherein:

the reporting includes information about the named person's tasks, procedures, computer code, development tools, and/or processes that are currently running within or accessed by the software test tool and that have not yet reached completion.

3. A method for monitoring activities of a named person for developing a computer program, the method comprising the steps of:

logging real-time development activity information about one or more operations performed by (a) a software build tool to build the computer program or (b) a software test tool to test the computer program, a record in the log for each of the operations comprising an identity of a person that requested the operation and a time stamp of the operation; and responsive to a user request to identify the activities of the named person, determining that the named person is currently accessing the software build tool or software test tool, and in response, querying the log records with a time stamp within a predetermined period to determine that the named person has used the software build tool or software test tool to develop the computer program within the predetermined period, and reporting to the user that the named person has used the software build tool or software test tool to develop the computer program within the predetermined period;

wherein:

the reporting includes information about the named person's tasks, procedures, computer code, development tools, and/or processes that are currently running within or accessed by the software build tool or software test tool and that have not yet reached completion.

4. The method of claim 3, wherein to build the computer program includes converting a plurality of source code files into a single standalone software that can run on a computer by compiling and linking the plurality of source code files in the correct order; wherein compiling means transforming source code into machine executable code; and wherein linking means combining in the correct order objects generated by compiling the plurality of source code files into a single machine executable program.

5. The method of claim 3, wherein to test the computer program at least includes validating and verifying that the computer program:

meets the requirements that guided its design and development;

works as it was designed to work;

can be implemented with the same characteristics as it was designed to have;

satisfies the needs of a corporation;

satisfies the needs of the named person or their employer;

does not contain any bugs, errors, or other defects; or any combination thereof.

6. The method of claim 3, wherein the one or more operations performed are performed by a software development environment.

7. The method of claim 6 wherein the logging of the one or more operations is performed by the software development environment.

8. The method of claim 7:

wherein the log for each of the operations further comprises one or more of project name, activity description, and user request receipt date that relate to the activities of the named person;

wherein the user request to identify the activities of the named person further includes a request to identify the activities of the named person at a predetermined time interval after a file, workspace, project, changeset, or method has been modified; and wherein reporting to the user further includes one or more of project name, activity description, and user request receipt date that relate to the activities of the named person.

9. The method of claim 3:
further comprising determining an extent to which the user is authorized to receive information regarding whether the named person has used the software build tool or software test tool to develop the computer program within the predetermined period; and
wherein the reporting is done only to the extent that the user has been determined to be authorized.

10. The method of claim 9 wherein determining the extent to which the user is authorized to receive information includes determining an authorized portion of the user request.

11. The method of claim 9 wherein determining the extent to which the user is authorized to receive information includes determining an authorized portion of project activity information that is associated with the request.

12. The method of claim 9 wherein determining the extent to which the user is authorized to receive information includes transmitting an authorization request to the named person and receiving authorization from the named person for at least a portion of the user request.

13. The method of claim 12 wherein transmitting the authorization request to the named person is performed subsequently to the determination that the named person is currently accessing the software build tool or software test tool, and the authorization request includes an authorization prompt prompting the named person in real time for a response.

14. The method of claim 9 wherein determining the extent to which the user is authorized to receive information is based, at least in part, on a pre-determined privacy setting of the named person with respect to the user.

15. The method of claim 14 wherein the pre-determined privacy setting information is determined by a person other than the named person, or is derived automatically from the relationship between the named person and the user.

* * * * *